US011711696B1

(12) United States Patent
Kessler et al.

(10) Patent No.: US 11,711,696 B1
(45) Date of Patent: Jul. 25, 2023

(54) SYSTEMS AND METHODS FOR IMPLEMENTING AN AIRLINE TICKET COUNTER SYSTEM IN A MOBILE APP

(71) Applicant: METROPOLITAN WASHINGTON AIRPORTS AUTHORITY, Washington, DC (US)

(72) Inventors: Christian Kessler, Washington, DC (US); Balaji Karuppiah, Washington, DC (US); Dhamotharakkannen Seenivasagam, Washington, DC (US)

(73) Assignee: Metropolitan Washington Airports Authority, Washington, DC (US)

( * ) Notice: Subject to any disclaimer, the term of this patent is extended or adjusted under 35 U.S.C. 154(b) by 723 days.

(21) Appl. No.: 16/356,900

(22) Filed: Mar. 18, 2019

Related U.S. Application Data

(60) Provisional application No. 62/642,015, filed on Mar. 13, 2018.

(51) Int. Cl.
| | |
|---|---|
| *G06F 3/048* | (2013.01) |
| *H04W 12/30* | (2021.01) |
| *H04L 9/40* | (2022.01) |
| *G06Q 10/02* | (2012.01) |
| *G06F 3/0482* | (2013.01) |
| *G06F 3/04817* | (2022.01) |
| *G06F 3/0484* | (2022.01) |

(52) U.S. Cl.
CPC .......... *H04W 12/35* (2021.01); *G06F 3/0482* (2013.01); *G06F 3/0484* (2013.01); *G06F 3/04817* (2013.01); *G06Q 10/02* (2013.01); *H04L 63/083* (2013.01); *H04L 63/0884* (2013.01)

(58) Field of Classification Search
None
See application file for complete search history.

(56) References Cited

U.S. PATENT DOCUMENTS

| | | | |
|---|---|---|---|
| 6,912,540 B2 | 6/2005 | Kohut | |
| 6,950,037 B1 | 9/2005 | Clavier | |
| 8,112,390 B2 | 2/2012 | Gejdos | |
| 8,719,868 B2 | 5/2014 | Tsai | |
| 8,965,600 B2 | 2/2015 | Kolbe | |
| 10,375,059 B1* | 8/2019 | Fieldman | G06F 21/10 |
| 2003/0196097 A1 | 10/2003 | Korosec | |
| 2006/0041651 A1 | 2/2006 | Walcutt | |
| 2010/0078475 A1* | 4/2010 | Lin | G06Q 50/14 |
| | | | 235/380 |
| 2013/0304486 A1* | 11/2013 | Jagemann | G06Q 50/01 |
| | | | 705/2 |
| 2014/0162598 A1 | 6/2014 | Villa-Real | |
| 2014/0369570 A1 | 12/2014 | Cheikh | |

(Continued)

OTHER PUBLICATIONS

Wikipedia, Amazon Web Services, Jul. 18, 2016, pp. 1-9, https://en.wikipedia.org/wiki/Amazon_Web_Services.
(Continued)

*Primary Examiner* — Tuan S Nguyen
(74) *Attorney, Agent, or Firm* — Juneau & Mitchell; Todd L. Juneau

(57) ABSTRACT

The invention is directed to systems and methods for implementing an airline ticket counter system in a mobile app that allows for ticket counters to be re-assignable and re-configurable across employee permission levels and across different airline companies with their own employee access policies.

7 Claims, 13 Drawing Sheets

(56) References Cited

U.S. PATENT DOCUMENTS

2015/0085128 A1    3/2015  Pineau
2018/0096130 A1*   4/2018  Purkiss ............... H04L 63/0876
2018/0176268 A1*   6/2018  Malatesha ............... H04L 67/42

OTHER PUBLICATIONS

Wikipedia, Application programming interface, Jul. 18, 2016, pp. 1-14, https://en.wikipedia.org/wiki/Application_programming_interface.
Wikipedia, BitTorrent, Jul. 18, 2016, pp. 1-19, https://en.wikipedia.org/wiki/BitTorrent.
Wikipedia, Data integration, Jul. 18, 2016, pp. 1-7, https://en.wikipedia.org/wiki/Data_integration.
Wikipedia, Drupal, Jul. 18, 2016, pp. 1-13, https://en.wikipedia.org/wiki/Drupal.
Wikipedia, Firebase, Jul. 18, 2016, pp. 1-5, https://en.wikipedia.org/wiki/Firebase.
Flightstats Developer Center, FlightStats Flex API Reference Jul. 18, 2016, pp. 1-8, https://developer.flightstats.com/api-docs/.
Heroku Dev Center, How Heroku Works, Jul. 18, 2016, pp. 1-10, https://devcenter.heroku.com/articles/how-heroku-works.
Wikipedia, JSON, Jul. 18, 2016, pp. 1-15, https://en.wikipedia.org/wiki/JSON.
Wikipedia, OpenID, Jul. 18, 2016, pp. 1-12, https://en.wikipedia.org/wiki/OpenID.
Wikipedia, Representational state transfer, Jul. 18, 2016, pp. 1-7, https://en.wikipedia.org/wiki/Representational_state_transfer.
Wikipedia, SOAP, Jul. 18, 2016, pp. 1-6, https://en.wikipedia.org/wiki/SOAP.
The VLDB Journal, Daniel J. Abadi, Aurora: a new model and architecture for data stream management, 2003, pp. 1-20

* cited by examiner

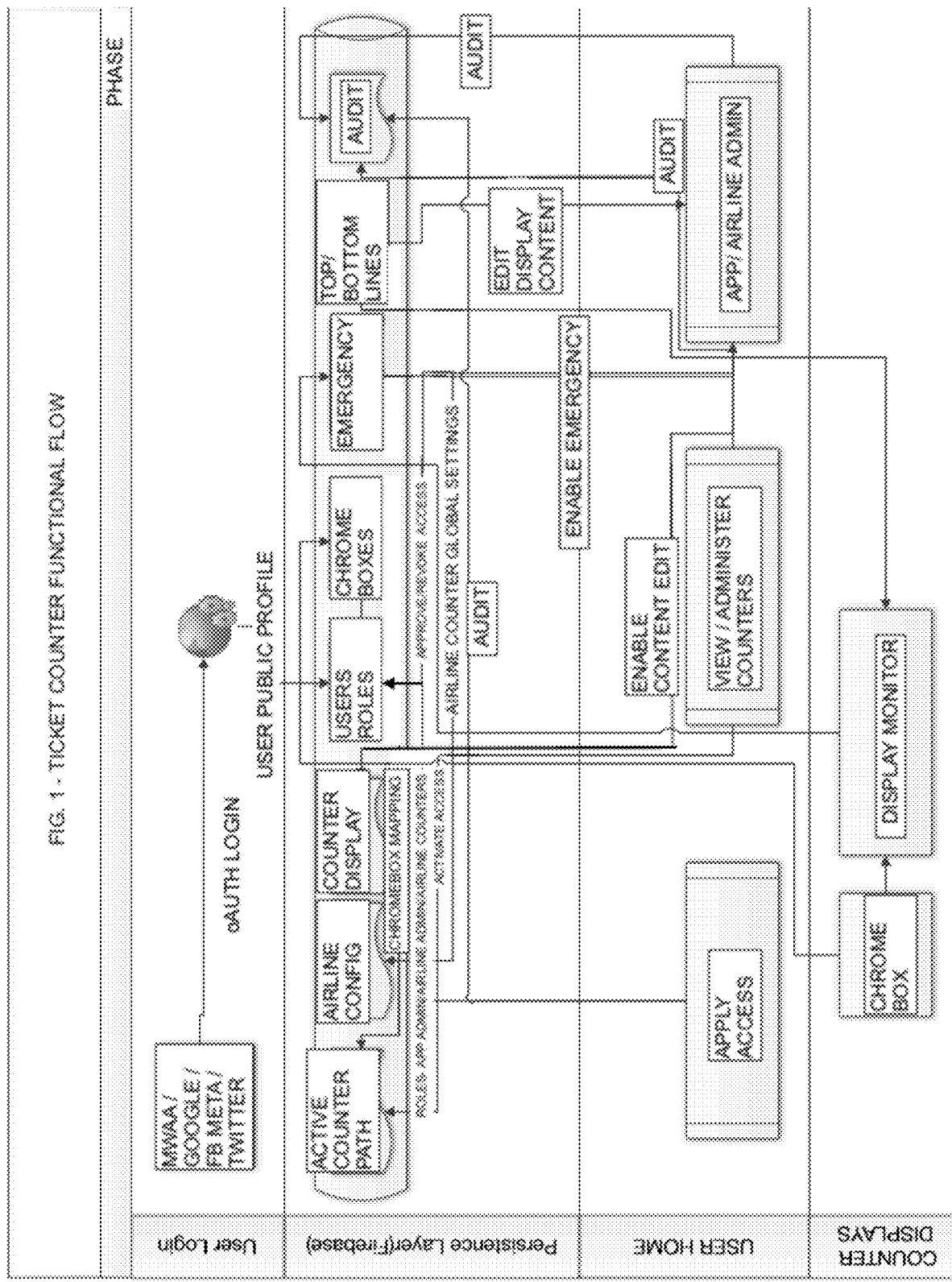
FIG. 1 - TICKET COUNTER FUNCTIONAL FLOW

FIGURE 2

STEP 1
Display Ticket Counter Login Screen
with
Multiple Login Options
including
a Facility Identity Login Option,
a Facebook Identity Login Option,
a Twitter Identity Login Option, or
a Google Account Identity Login Option

STEP 2
Receive User Selection and
Display Selected Identity Login Page

STEP 3
Receive User ID and password, and
Connect to Transaction Server
for Authentication

FIGURE 8

STEP 1
Display
User Updated Apply for Access page

STEP 2
Display
Approved Airline Carrier(s)
authorized for User
and Display Counter buttons for each approved counter STEP 3
Display
Navigation bar
including
Home Module button,
About Module button, and
Contact Module button STEP 4
Receive User Selection of Counter
and
Display Approve/Reject Dialog for selection STEP 5
Display Approved Ticker Counter(s)
and offer assignment or rejection buttons STEP 6
Receive Authorization Signal from Server
and Assigned Display Ticker Counter
for User STEP 7
Display an Admin Revocation page
to revoke User privileges and services

FIGURE 12

STEP 1
Display App page
for Control Ticket Counter Signage

STEP 2
Display
Text Display Type options button,
Top Line Text entry button,
Bottom Line Text entry button,
Monitor on/off button,
Content Display on/off toggle, and
Display Option menu button

STEP 3
Receive User Selections of
Text Display Type options,
Top Line Text entry,
Bottom Line Text entry,
Monitor on/off,
Content Display on/off, and
Display Option menu selection

STEP 4
Display Enable Emergency Message button
and connect to
Emergency Message Module for options

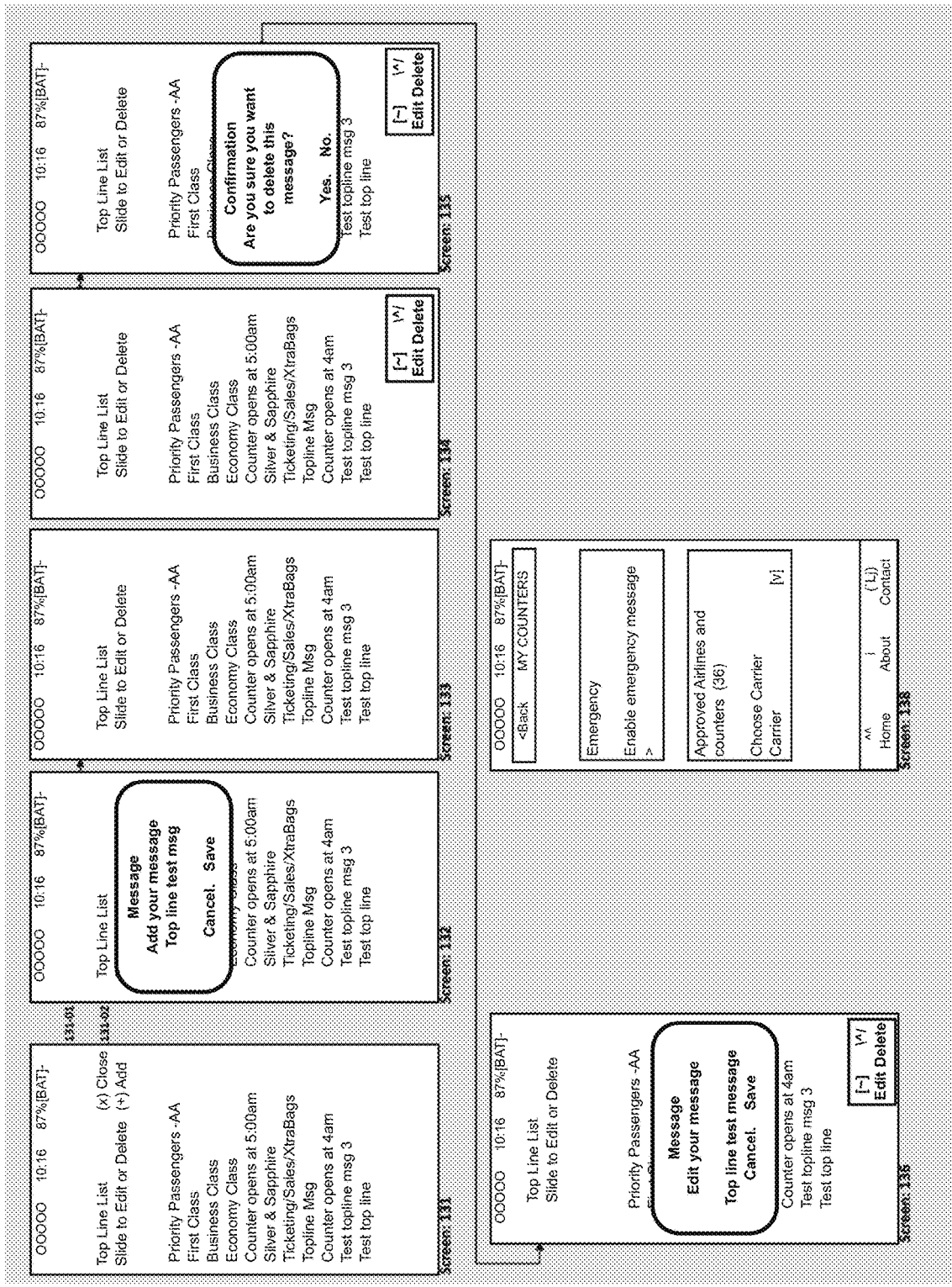

SYSTEMS AND METHODS FOR IMPLEMENTING AN AIRLINE TICKET COUNTER SYSTEM IN A MOBILE APP

CROSS-REFERENCE TO RELATED APPLICATIONS

Provided per USPTO rules by Application Data Sheet.

STATEMENT REGARDING FEDERALLY SPONSORED R&D

Provided per USPTO rules by Application Data Sheet.

NAMES OF PARTIES TO JOINT RESEARCH AGREEMENT

Provided per USPTO rules by Application Data Sheet.

REFERENCE TO SEQUENCE LISTING

Provided per USPTO rules by Application Data Sheet.

STATEMENT RE PRIOR DISCLOSURES

Provided per USPTO rules by Application Data Sheet.

BACKGROUND OF THE INVENTION

Field of the Invention

The invention relates to a mobile app, systems and methods for implementing an airline ticket counter system in a mobile app that allows for ticket counters to be re-assignable and re-configurable across employee permission levels and across different airline companies with their own employee access policies.

Description of the Related Art

U.S. Pat. No. 8,972,297 discloses systems and methods for allow greater access to a banking platform via a mobile device. The customer can initiate a financial transaction using a mobile device, a bank can inform the customer of the nearest financial transaction terminal to perform that service, and the customer can complete that financial transaction at the financial transaction terminal using the mobile device as a user interface. While conventional systems may use a mobile device to transmit payment information at a point of sale terminal of a brick-and-mortar merchant, that patent discloses that a customer may conduct a transaction at a financial transaction terminal using the mobile device to initiate a transaction at a location away from a financial transaction terminal, to locate the nearest financial transaction terminal providing the required services, and as a user interface while communicating with the financial transaction terminal.

U.S. Pat. No. 7,600,673 discloses a point-of-sale device useful in relation to a variety of circumstances and/or utilization methods. Various implementations of such point-of-sale devices are disclosed. For example, one particular point-of-sale device includes a base unit adapted for performing merchant functions and a peripheral unit adapted to perform customer functions. The base unit can include a base unit housing with a processor disposed therein and capable of supporting a variety of transaction types.

U.S. Pat. No. 7,086,584 discloses a variety of systems and methods for configuring and/or providing a configurable point-of-sale system. Various methods include providing a point-of-sale device and coupling it to a communication network. One or more transaction systems are accessible to the point-of-sale device via the transaction network, instructions are loaded to the memory of the point-of-sale device allowing it to access the transaction system. Various systems include a plurality of point-of-sale devices communicably coupled to various transaction systems via a communication network. The point-of-sale devices can be configurable to access one or more of the various transaction systems.

BRIEF SUMMARY OF THE INVENTION

Accordingly, the invention provides in preferred embodiments, a mobile app that implements an airline ticket counter, and in particular to a mobile app that controls logins of different categories of employee users from different companies sharing, re-using and re-configuring ticket counters on an ad hoc basis.

In one preferred embodiment, there is provided in the description and claims an invention of a Method and Mobile Application for Presenting Graphical User Information for a method for implementing an airline ticket counter system, the method comprising:

providing a ticket counter device, wherein the ticket counter device includes a processor, a memory, a user display, at least one user input device, and a network communication interface, and wherein the ticket counter device has computer program instructions executable by the processor for performing the following steps;

STEP 1 Displaying a Ticket Counter Login Screen with Multiple Login Options including a Facility Identity Login Option, a Facebook Identity Login Option, a Twitter Identity Login Option, or a Google Account Identity Login Option;

STEP 2 Receiving a User Selection and Displaying a Selected Identity Login Page;

STEP 3 Receiving a User ID and password, and Connecting to Transaction Server for Authentication;

STEP 4 Displaying a Ticket Counter Banner with a User Identity and Access level confirmation;

STEP 5 Displaying a MyAccess Module button and a MyCounter Module button and a User Admin Module button;

STEP 6 Displaying a Navigation bar including a Home Module button, a About Module button, and a Contact Module button;

STEP 7 Receiving a User Selection of selected items on a Module and Display Selected Module Page;

STEP 8 Displaying an Apply for Access page;

STEP 9 Displaying a Carrier Selection Module button and a Counter Selection Module button and a User Role Module button;

STEP 10 Displaying a Navigation bar including a Home Module button, an About Module button, and a Contact Module button;

STEP 11 Receiving a User Selection of Module and Display Selected Module Page;

STEP 12 Displaying a Carrier Selection Module page wherein upon being selected Displaying a List of Airlines along with a Cancel button and an OK confirmation button;

STEP 13 Displaying a Counter Selection Module page wherein upon being selected Displaying a List of Airline Ticket Counter locations along with a Cancel button and an OK confirmation button;

STEP 14 Displaying a User Role Module page wherein upon being selected Displaying a List of User Roles including Airline admin and Application admin along with a Cancel button and an OK confirmation button;

STEP 15 Displaying an Apply page and a series of confirmation pages to save and transmit selections to the transaction server;

STEP 16 Displaying a User Updated Apply for Access page;

STEP 17 Displaying a list of Approved Airline Carrier(s) authorized for User and Display Counter buttons for each approved counter;

STEP 18 Displaying Navigation bar including a Home Module button, an About Module button, and a Contact Module button;

STEP 19 Receiving a User Selection from a Counter and Display Approve/Reject Dialog for selection;

STEP 20 Displaying one or more Approved Ticker Counter(s) and offer assignment or rejection buttons;

STEP 21 Receiving an Authorization Signal from the transaction server and receiving an Assigned Display Ticker Counter for User; and STEP 22 Displaying an Admin Revocation page to revoke User privileges and services;

STEP 23 Displaying an App page for Controlling one or more display devices used for Ticket Counter Signage;

STEP 24 Displaying a Text Display Type options button, a Top Line Text entry button, a Bottom Line Text entry button, a Monitor on/off button, a Content Display on/off toggle, and a Display Option menu button;

STEP 25 Receiving User Selections of Text Display Type options, Top Line Text entry, Bottom Line Text entry, Monitor on/off, Content Display on/off, and Display Option menu selection;

STEP 26 Displaying Ticket Counter "Activation Successful" dialog with Ok Acknowledgement button STEP 27 Displaying an App page for Controlling Ticket Counter Signage that Displays an Enable Emergency Message button and connects to an Emergency Message Module for user selectable options; wherein all of the pages displayed on a tablet, a mobile device or computer terminal monitor and are generated and stored within a single application that is configured to communicate over the network communication interface to the transaction server, wherein the transaction server is connected to one or more databases having login information and protocols for assessing and assigning permissions and services.

In another preferred embodiment, there is provided in the description and claims an invention of a machine-readable non-transitory medium on which has been prerecorded a computer program which, when executed by a processor, performs the steps of claim 1.

In another preferred embodiment, there is provided in the description and claims an invention of a system for generating a Graphical User Information for Airline Ticket Counter provisioning comprising computer-implemented means for performing the steps of claim 1.

In another preferred embodiment, there is provided in the description and claims an invention of a system comprising: a processor; and a mobile communication unit configured to communicate with one or more mobile devices via a telecommunication network; and a memory storage unit configured to store instructions, which when executed by the processor, cause the system to perform operations to, STEP 1: install application software for executing instructions on a processor for the method of claim 1 on a handheld mobile communication device;

STEP 2: execute user subscription module on a remote computer, execute validation module within validation database, and execute authentication module within authentication database;

STEP 3: execute a Ticket Counter module at the remote computer and transmitting a Ticket Counter LOGIN GUI to the handheld device, a COUNTER SELECTION GUI to the handheld device, a COUNTER DISPLAY CONTROL GUI to the handheld device, and an ADMIN MANAGEMENT GUI to the handheld device.

In another preferred embodiment, there is provided in the description and claims an invention of a system comprising the modules set forth in claim 1.

In another preferred embodiment, there is provided in the description and claims an invention of a mobile app that uses the system of claim 5 to display the pages of claim 1.

In another preferred embodiment, there is provided in the description and claims an invention of a desktop application for administering the system of claim 3, 4, or 5, comprising the pages of claim 1.

BRIEF DESCRIPTION OF THE SEVERAL VIEWS OF DRAWING

FIG. 1 is a flowchart illustrating TICKET COUNTER FUNCTIONAL FLOW including processes for User Login, Persistence Layer Processes, User Home processes, and Counter Display processes.

FIG. 2 is a LOGIN flowchart illustrating in a preferred embodiment a set of steps within the mobile app and method of the present inventive subject matter.

FIG. 8 is a COUNTER ACCESS flowchart illustrating a preferred embodiment of a set of counter access and user administration steps within the mobile app and method of the present inventive subject matter.

FIG. 12 is a TOP LINE LIST flowchart in a preferred embodiment illustrating a preferred embodiment of a set of counter display input steps within the mobile app and method of the present inventive subject matter.

FIG. 13 is a series of graphical user interfaces illustrating a prototype of a TOP LINE LIST process.

DETAILED DESCRIPTION OF THE INVENTION

Figure 3:
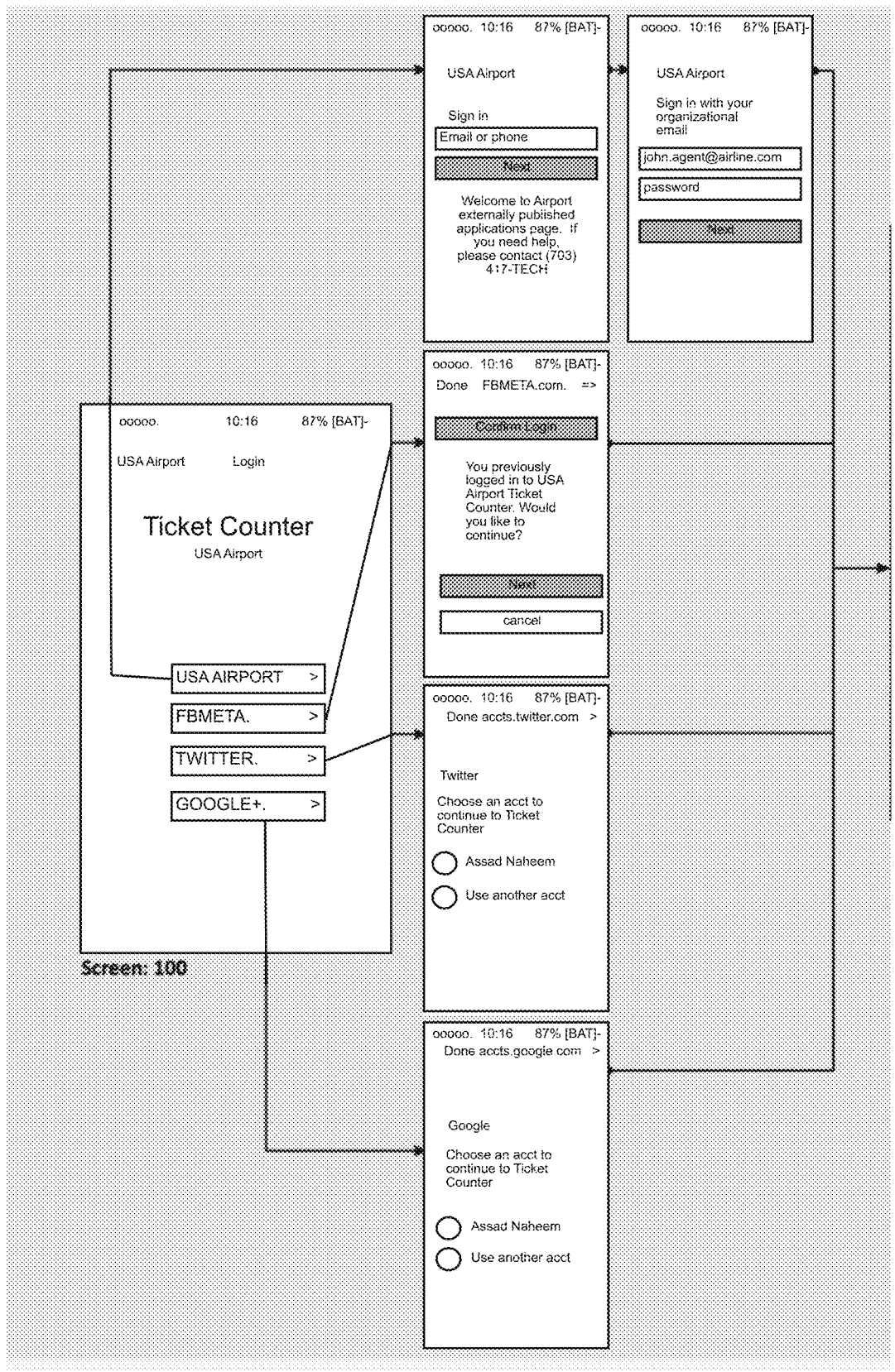
FIG. 3 is a series of graphical user interfaces illustrating a prototype of a LOGIN process.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

It will be appreciated that the present disclosure may be embodied as methods, systems, or computer program products. Accordingly, the present inventive concepts disclosed herein may take the form of a hardware embodiment, a software embodiment or an embodiment combining software and hardware aspects. Furthermore, the present inventive concepts disclosed herein may take the form of a computer program product on a computer readable storage medium having non-transitory computer usable program code embodied in the medium. Any suitable computer readable medium may be utilized including hard disks, CD-ROMs, optical storage devices, flash memories, or magnetic storage devices.

Computer program code or software programs that are operated upon or for carrying out operations according to the teachings of the invention may be written in a high level programming language such as C, C++, JAVA®, Smalltalk, JavaScript®, Visual Basic®, TSQL, Python, Ruby, Perl, use of .NET™ Framework, Visual Studio® or in various other programming languages. Software programs may also be written directly in a native assembler language for a target processor. A native assembler program uses instruction mnemonic representations of machine level binary instructions. Program code or computer readable medium as used herein refers to code whose format is understandable by a processor. Software embodiments of the disclosure do not depend upon their implementation with a particular programming language.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal subparts. As will be understood by one skilled in the art, a range includes each individual member.

Referring now to the drawings, FIG. 1 is a flowchart illustrating TICKET COUNTER FUNCTIONAL FLOW including processes for User Login, Persistence Layer Processes, User Home processes, and Counter Display processes.

FIG. 2 is a LOGIN flowchart illustrating in a preferred embodiment a set of steps within the mobile app and method of the present inventive subject matter.

FIG. 3 is a series of graphical user interfaces illustrating a prototype of a LOGIN process.

Figure 4:
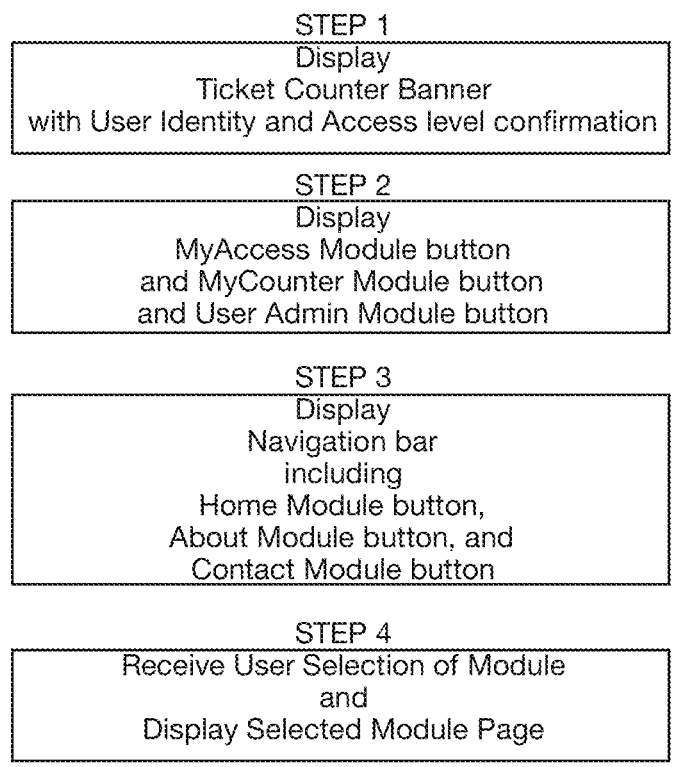
FIG. 4 is an MANAGEMENT flowchart for user access, counter display, and user access management illustrating a preferred embodiment of a set of management steps within the mobile app and method of the present inventive subject matter.

FIG. 4 is an MANAGEMENT flowchart for user access, counter display, and user access management illustrating a preferred embodiment of a set of management steps within the mobile app and method of the present inventive subject matter.

Figure 5:
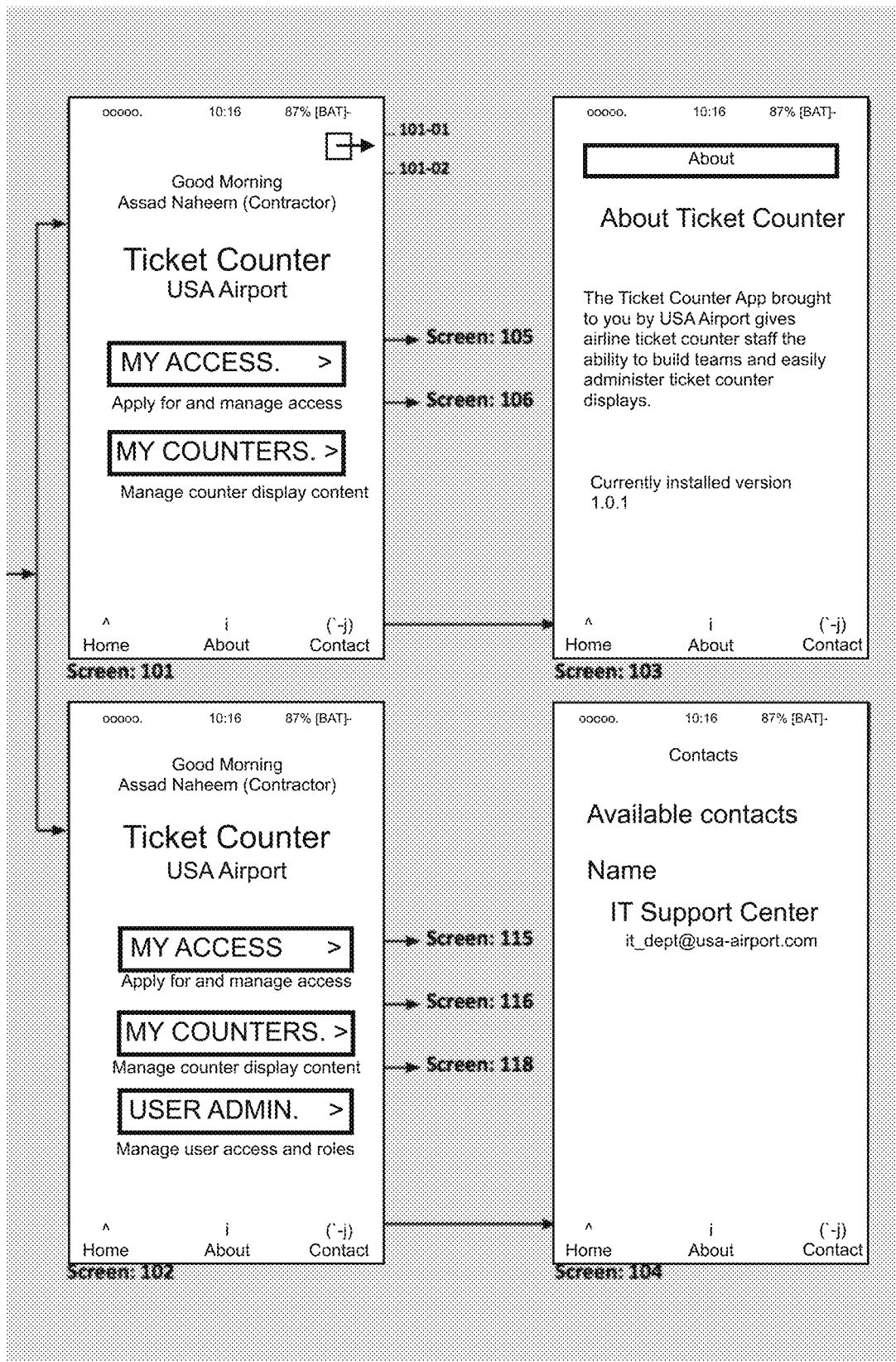
FIG. 5 is a series of graphical user interfaces illustrating a prototype of MANAGEMENT of a user access, counter display, and user access management processes.

FIG. 5 is a series of graphical user interfaces illustrating a prototype of MANAGEMENT of a user access, counter display, and user access management processes.

Figure 6:
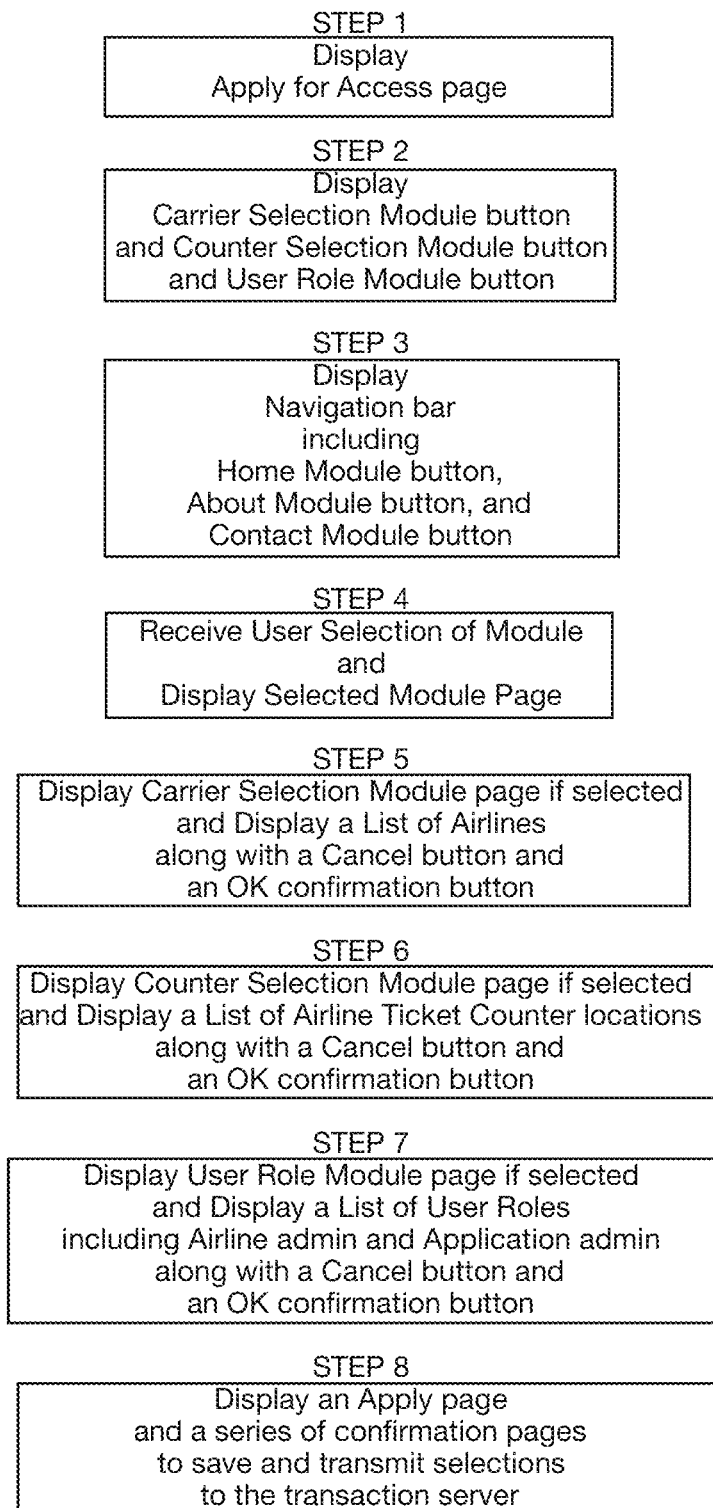
FIG. 6 is two flowchart processes COUNTER and CARRIER flows illustrating a preferred embodiment of a set of counter and carrier steps within the mobile app and method of the present inventive subject matter.

FIG. 6 is two flowchart processes COUNTER and CARRIER flows illustrating a preferred embodiment of a set of counter and carrier steps within the mobile app and method of the present inventive subject matter.

Figure 7:
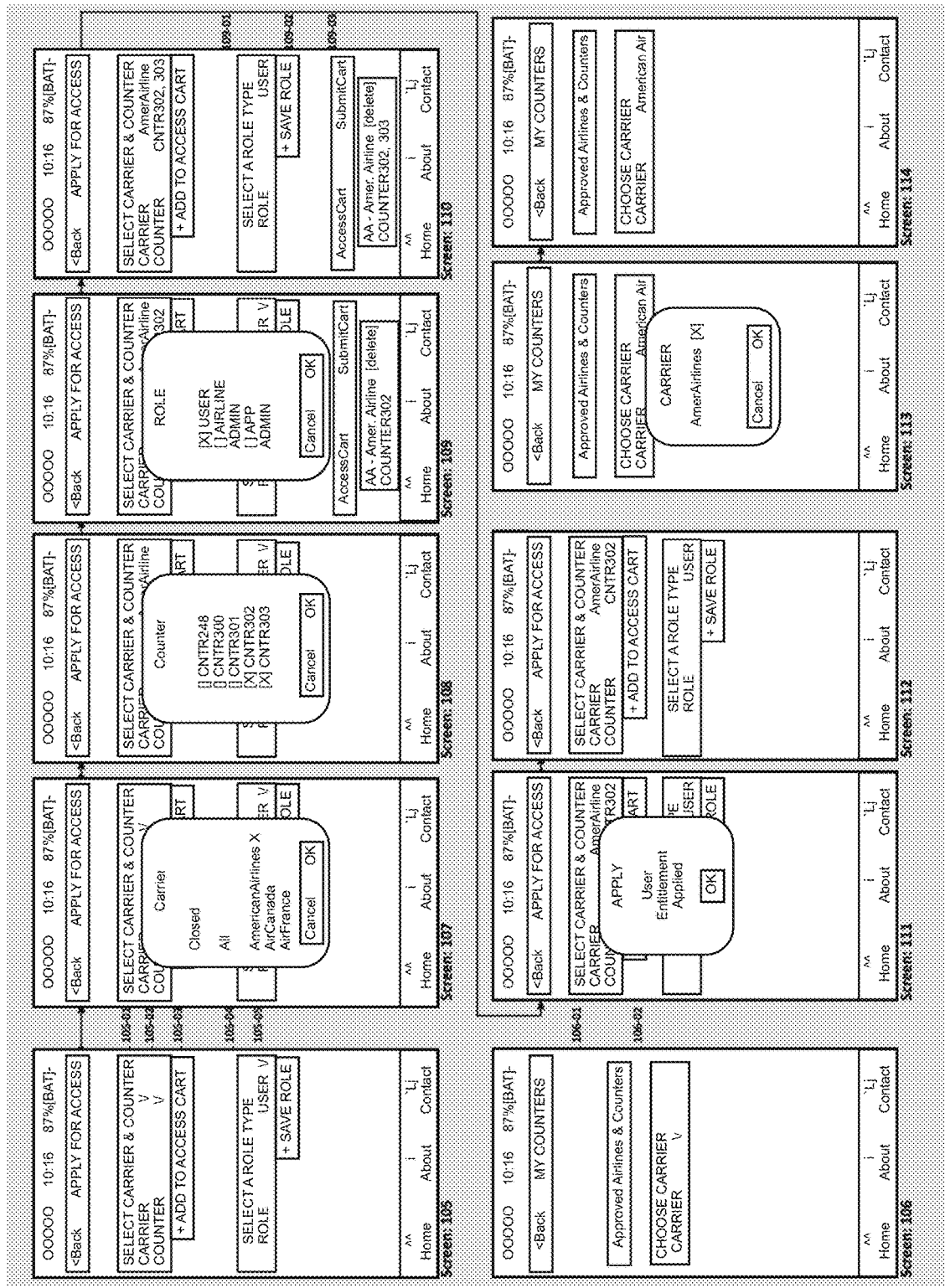
FIG. 7 is a series of graphical user interfaces illustrating a prototype of COUNTER and CARRIER processes/flows.

FIG. 7 is a series of graphical user interfaces illustrating a prototype of COUNTER and CARRIER processes/flows.

FIG. 8 is a COUNTER ACCESS flowchart illustrating a preferred embodiment of a set of counter access and user administration steps within the mobile app and method of the present inventive subject matter.

Figure 9:
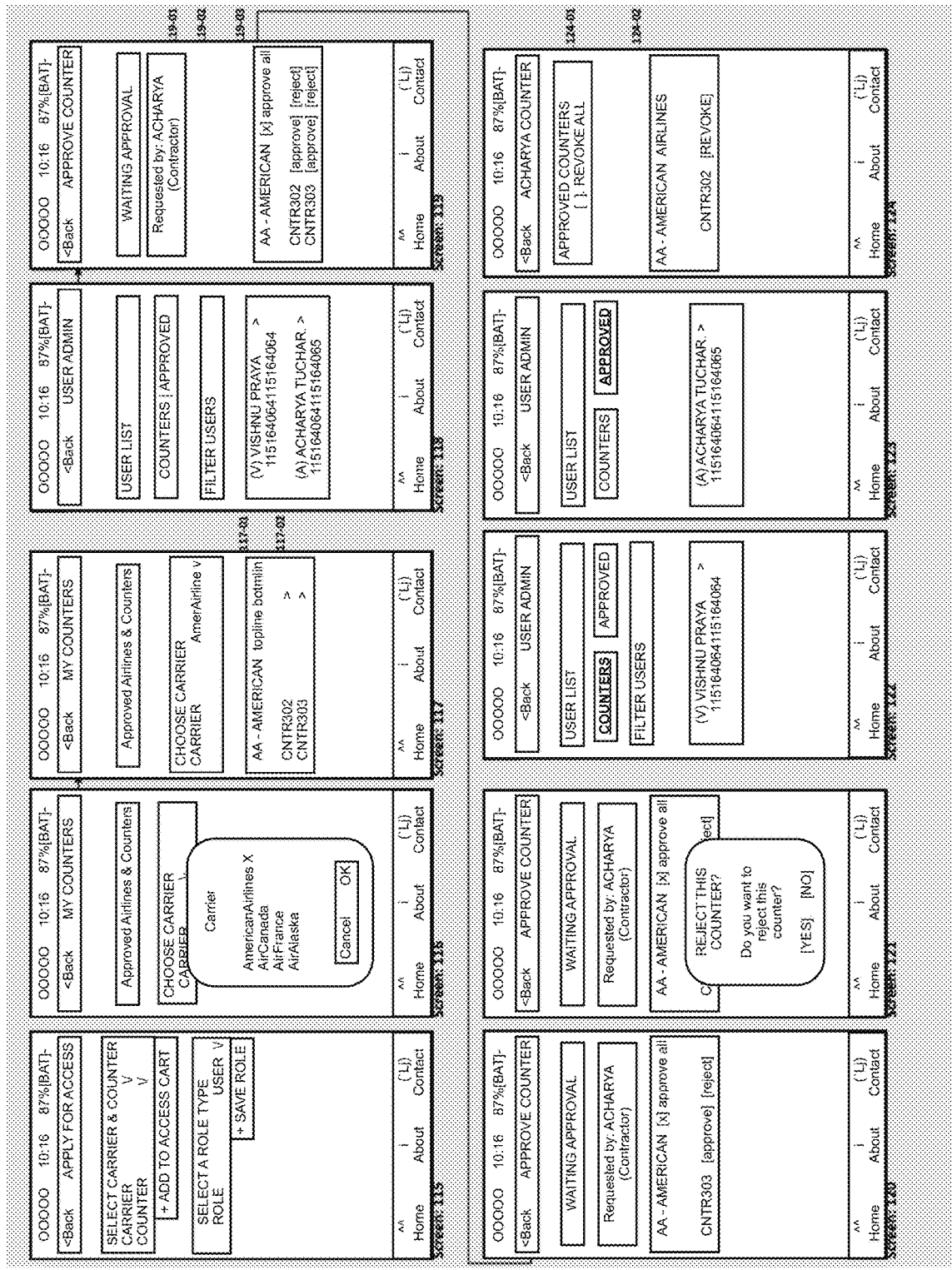
FIG. 9 is a series of graphical user interfaces illustrating a prototype of a COUNTER ACCESS process.

FIG. 9 is a series of graphical user interfaces illustrating a prototype of a COUNTER ACCESS process.

Figure 10:
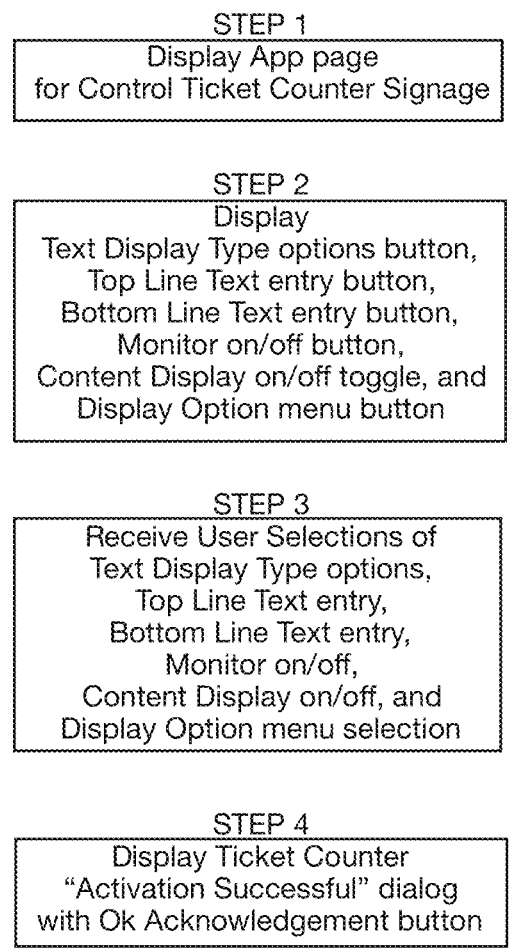
FIG. 10 is a COUNTER ACTIVATION and COUNTER DISPLAY flowchart in a preferred embodiment illustrating a preferred embodiment of a set of counter activation and counter display steps within the mobile app and method of the present inventive subject matter.

FIG. 10 is a COUNTER ACTIVATION and COUNTER DISPLAY flowchart in a preferred embodiment illustrating a preferred embodiment of a set of counter activation and counter display steps within the mobile app and method of the present inventive subject matter.

Figure 11:
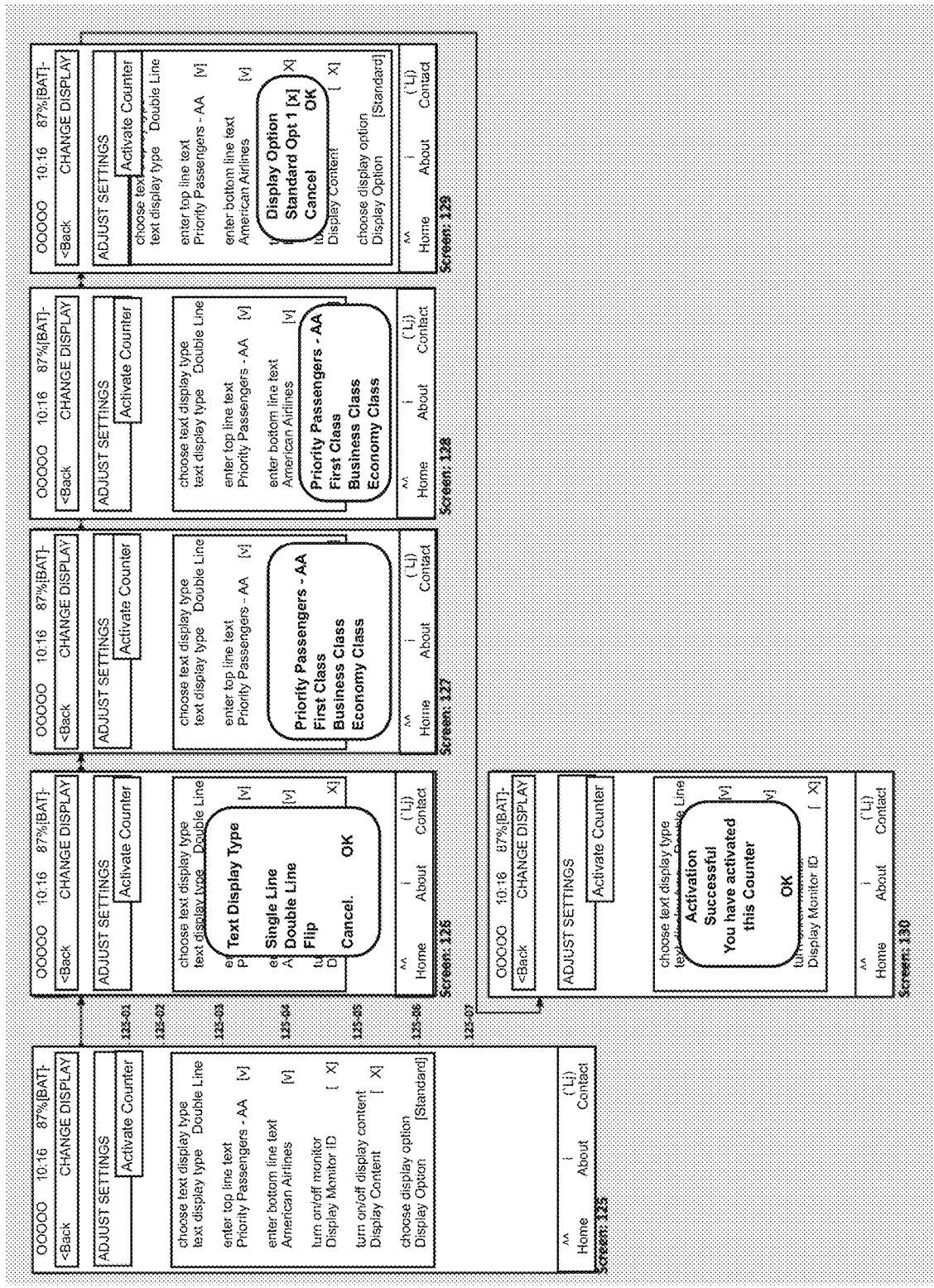
FIG. 11 is a series of graphical user interfaces illustrating a prototype of COUNTER ACTIVATION and COUNTER DISPLAY processes.

FIG. 11 is a series of graphical user interfaces illustrating a prototype of COUNTER ACTIVATION and COUNTER DISPLAY processes.

FIG. 12 is a TOP LINE LIST flowchart in a preferred embodiment illustrating a preferred embodiment of a set of counter display input steps within the mobile app and method of the present inventive subject matter.

FIG. 13 is a series of graphical user interfaces illustrating a prototype of a TOP LINE LIST process.

Flowcharts

Included herein as a non-limiting teaching of the manner of making and using the claimed and disclosed inventive subject matter are a series of flowcharts. Some flowcharts provide a more global view, and other flowcharts provide a granular level of detail about the invention. The flowcharts are not meant to be limiting, and the inclusion or exclusion or specific features on these flowcharts is made only to provide specific examples, and not to indicate a waiver or disclaimer of subject matter fairly taught elsewhere in the specification, or known to a person of ordinary skill in the art.

Application Programming Interfaces (APIs)

In a preferred aspect, the invention uses an application programming interface (API) architecture to define the programmable interfaces through which the system interacts with applications that use its assets. This allows the programmable interfaces to provide different sets of services to different application serving different types of consumers. The API disclosed herein uses custom library code in order to provide reuseable modules that are determined based upon the user interface that is accessing the library. These precoded modules allow application-specific access to the database that contains the real-time data feeds from multiple external systems that have been converted into the device-modified special purpose output data feed for distribution to displays and user equipment.

In a preferred aspect, the API architecture includes an end user component that interacts with a client applications user component where the client applications component connects to and leverages a core API infrastructure. In one preferred embodiment of the invention, the core API infrastructure includes a security layer that interfaces with a caching layer, a representation layer connected to the caching layer, an orchestration layer between the representation layer and the API implementation layer, and a backend layer interfacing with the API implementation layer.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

Having described embodiments for the invention herein, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A method for implementing an airline ticket counter system, the method comprising:

providing a ticket counter device, wherein the ticket counter device includes a processor, a memory, a user display, at least one user input device, and a network communication interface, and wherein the ticket counter device has computer program instructions executable by the processor for performing the following steps;

STEP 1 Displaying a Ticket Counter Login Screen with Multiple Login Options including a Facility Identity Login Option, a Facebook Identity Login Option, a Twitter Identity Login Option, or a Google Account Identity Login Option;

STEP 2 Receiving a User Selection and Displaying a Selected Identity Login Page;

STEP 3 Receiving a User ID and password, and Connecting to Transaction Server for Authentication;

STEP 4 Displaying a Ticket Counter Banner with a User Identity and Access level confirmation;

STEP 5 Displaying a MyAccess Module button and a MyCounter Module button and a User Admin Module button;

STEP 6 Displaying a Navigation bar including a Home Module button, a About Module button, and a Contact Module button;

STEP 7 Receiving a User Selection of selected items on a Module and Display Selected Module Page;

STEP 8 Displaying an Apply for Access page;

STEP 9 Displaying a Carrier Selection Module button and a Counter Selection Module button and a User Role Module button;

STEP 10 Displaying a Navigation bar including a Home Module button, an About Module button, and a Contact Module button;

STEP 11 Receiving a User Selection of Module and Display Selected Module Page;

STEP 12 Displaying a Carrier Selection Module page wherein upon being selected Displaying a List of Airlines along with a Cancel button and an OK confirmation button;

STEP 13 Displaying a Counter Selection Module page wherein upon being selected Displaying a List of Airline Ticket Counter locations along with a Cancel button and an OK confirmation button;

STEP 14 Displaying a User Role Module page wherein upon being selected Displaying a List of User Roles including Airline admin and Application admin along with a Cancel button and an OK confirmation button;

STEP 15 Displaying an Apply page and a series of confirmation pages to save and transmit selections to the transaction server;

STEP 16 Displaying a User Updated Apply for Access page;

STEP 17 Displaying a list of Approved Airline Carrier(s) authorized for User and Display Counter buttons for each approved counter;

STEP 18 Displaying Navigation bar including a Home Module button, an About Module button, and a Contact Module button;

STEP 19 Receiving a User Selection from a Counter and Display Approve/Reject Dialog for selection;

STEP 20 Displaying one or more Approved Ticker Counter(s) and offer assignment or rejection buttons;

STEP 21 Receiving an Authorization Signal from the transaction server and receiving an Assigned Display Ticker Counter for User; and STEP 22 Displaying an Admin Revocation page to revoke User privileges and services;

STEP 23 Displaying an App page for Controlling one or more display devices used for Ticket Counter Signage;

STEP 24 Displaying a Text Display Type options button, a Top Line Text entry button, a Bottom Line Text entry button, a Monitor on/off button, a Content Display on/off toggle, and a Display Option menu button;

STEP 25 Receiving User Selections of Text Display Type options, Top Line Text entry, Bottom Line Text entry, Monitor on/off, Content Display on/off, and Display Option menu selection;

STEP 26 Displaying Ticket Counter "Activation Successful" dialog with Ok Acknowledgement button STEP 27 Displaying an App page for Controlling Ticket Counter Signage that Displays an Enable Emergency Message button and connects to an Emergency Message Module for user selectable options;

wherein all of the pages displayed on a tablet, a mobile device or computer terminal monitor and are generated and stored within a single application that is configured to communicate over the network communication interface to the transaction server, wherein the transaction server is connected to one or more databases having login information and protocols for assessing and assigning permissions and services.

2. A machine-readable non-transitory medium on which has been prerecorded a computer program which, when executed by a processor, performs the steps of claim 1.

3. A system for generating a Graphical User Interface for Airline Ticket Counter provisioning, comprising a computer that is implemented for performing the method of claim 1.

4. A system comprising:
a processor; and
a mobile communication unit configured to communicate with one or more mobile devices via a telecommunication network; and
a memory storage unit configured to store instructions, which when executed by the processor, cause the system to perform operations to,
STEP 1: install application software for executing instructions on a processor for the method of claim 1 on a handheld mobile communication device;
STEP 2: execute user subscription module on a remote computer, execute validation module within validation database, and execute authentication module within authentication database;
STEP 3: perform the method of claim 1.

5. A system comprising at least a processor configured to perform the method of claim 1.

6. A mobile app implemented on the system of claim 5 to perform the method of claim 1.

7. A desktop application implemented on the system of claim 3, 4, or 5, to perform the method of claim 1.

* * * * *